(12) United States Patent
Aoshima (10) Patent No.: US 7,527,116 B2
(45) Date of Patent: May 5, 2009

(54) SNOW LUBRICATION DEVICE FOR SNOWMOBILE

(75) Inventor: Masaru Aoshima, Shizuoka-ken (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 283 days.

(21) Appl. No.: 11/345,636

(22) Filed: Feb. 1, 2006

(65) Prior Publication Data
US 2006/0191728 A1 Aug. 31, 2006

(30) Foreign Application Priority Data
Feb. 2, 2005 (JP) ............................. 2005-026039

(51) Int. Cl.
*B62M 27/02* (2006.01)
(52) U.S. Cl. .................. 180/190; 37/219; 280/809; 280/900; 305/117
(58) Field of Classification Search ............ 280/28, 280/809, 762, 900; 180/190, 186; 305/117, 305/127, 107; 37/219, 220, 221, 263, 231, 37/232, 270
See application file for complete search history.

(56) References Cited

U.S. PATENT DOCUMENTS

| | | | | |
|---|---|---|---|---|
| 2,892,270 A | * | 6/1959 | Sharp | ................. 172/777 |
| 3,884,498 A | * | 5/1975 | Cote, Jr. | ............... 280/762 |
| 4,036,320 A | * | 7/1977 | Rabehl | ................. 180/9.1 |
| 4,076,089 A | * | 2/1978 | Sanders | ............... 180/190 |
| 4,127,949 A | * | 12/1978 | Sabrowsky et al. | .......... 37/221 |
| 5,277,266 A | * | 1/1994 | Robinson | ............... 180/190 |
| 6,026,600 A | * | 2/2000 | Lela | ........................... 37/219 |

FOREIGN PATENT DOCUMENTS

JP 2000-043781 2/2000

* cited by examiner

*Primary Examiner*—Anne Marie M. Boehler
(74) *Attorney, Agent, or Firm*—Knobbe Martens Olson & Bear LLP (57) ABSTRACT

A snow lubrication device attaches to a vehicle body of a snowmobile and includes a pair of snow rake rods extending from the vehicle body to contact a snow surface. A snow rake member located at the end of the snow rake rod scatters snow. The scattered snow lubricates gaps between a track belt and the slide rail and/or between the track belt and the drive wheel. The lubrication of the track belt improves operation of the snowmobile if the lower part of the snow rake rod strikes a stone or the like, the snow rake rod temporarily deflects further rearward. The snow lubrication device has relatively few components, is low in cost, and is hard to dislodge from a snowmobile.

20 Claims, 8 Drawing Sheets

SNOW LUBRICATION DEVICE FOR SNOWMOBILE

RELATED APPLICATIONS

The present application is based on and claims priority under 35 U.S.C. §119(a)-(d) to Japanese Patent Application No. 2005-026039, filed on Feb. 2, 2005, the entire contents of which are hereby expressly incorporated by reference herein.

BACKGROUND OF THE INVENTION

1. Field of the Invention

The present invention relates to a snow lubrication device for a snowmobile. Preferably, the snow lubrication device is attached to the front of the snowmobile and lubricates the gap between a track belt and a part of the snowmobile that is in contact with the track belt by raking and scattering snow.

2. Description of the Related Art

Snowmobiles are conventionally used by people moving on snowfields or the like in snowy regions. In the snowmobile, a track belt is routed around and between a drive wheel and a rear wheel. The snowmobile runs forward as the track belt is driven and circulated by the drive of an engine. In some snowmobiles, part of the track belt in contact with the drive wheel or part of the track belt in contact with a slide rail is lubricated. A snow rake-up means on the front of the vehicle body or on the underside of the steering skis scatters snow toward the rear part of the track belt.

These known snow rake-up means include a swing arm that extends in up and down directions in a rotatable state to the underside part of the vehicle body. The snow rake-up means provides a stopper for preventing the swing arm from moving forward beyond a specified position and a spring for urging a lower part of the swing arm forward. Therefore, when the snowmobile runs, the lower end of the swing arm rakes up and scatters snow toward the rear. When the lower end of the swing arm strikes earth or small stones under the snow surface, the swing arm moves back against the resilience of the spring, which prevents shock from being transmitted to the vehicle body. However, the snow rake-up means is complicated and costly due to the parts such as the spring and stopper.

SUMMARY OF THE INVENTION

An aspect of the present invention is directed toward addressing one or more of these problems and provides a snow lubrication device having a simple structure that lubricates a drive belt. Preferably, the snow lubrication device is attached to the front of the snowmobile and lubricates the gap between a track belt and a part of the snowmobile in contact with the track belt by raking and scattering snow. A snow lubrication device, which is configured in accordance with the embodiments disclosed herein, is simpler, lower in cost, and is less likely to become dislodged from the vehicle body.

When the track belt is pressed against the snow surface, the snow lubrication device scatters snow on the snow surface to lubricate the contact part of the track belt and part of the snowmobile in contact with the track belt. The snow lubrication device comprises a fixing member made up of a fixing part fixed to the front side part of the vehicle body of the snowmobile. The fixing member includes a cylindrical member into which a rod-shaped member having elasticity with its one end part is inserted, clamped, and/or fixed. The snow lubrication device also includes a snow rake member with its root end part fixed to the other end part of the rod-shaped member. A front-end of the snowmobile is formed with a blade part for raking snow.

The rod-shaped member can be fixed to the fixing member by clamping and fixing one end part of the rod-shaped member by applying a force to the outside round surface of the cylindrical part in the state of one end part of the rod-shaped member being inserted into the cylindrical part of the fixing member. Therefore, it is possible to firmly fix the rod-shaped member and the fixing member. Further, clamping and fixing can be accomplished by a crimping process. The parts of the snowmobile in contact with the track belt of the snowmobile include the drive wheel, the slide rail, or the like.

The joint between the fixing member and the rod-shaped member can be covered with a seal member. In this way, water is prevented from finding its way into the joint. In embodiments where the rod-shaped member is made of metal, covering the joint with a seal member inhibits rust from forming. The seal member may also improve the appearance of the joint between the fixing member and the rod-shaped member.

The root end part of the snow rake member can be thinner than the other end part of the rod-shaped member. The rod-shaped member can be fixed to the snow rake member by putting the root end part of the snow rake member end to end with the other end of the rod-shaped member. A cylindrical fixing member can be fitted over the end-to-end joint and fixed by clamping. The gap between the cylindrical fixing member and the root end part of the snow rake member can be at least partially filled with adhesive. In this way, the snow rake member has a reduced size and weight. Further, because the gap between the cylindrical fixing member and the root end part of the snow rake member is at least partially filled with adhesive, the snow rake member is firmly fixed through the cylindrical fixing member to the rod-shaped member, although the root end part of the snow rake member is thinner than the other end part of the rod-shaped member.

The joint part of the cylindrical fixing member and the rod-shaped member can be covered with a seal member. Water is prevented from finding its way into the joint area between the cylindrical fixing member and the rod-shaped member. Further, if the rod-shaped member is made from a metal prone to rust corrosion, a seal member covering the outside surface of the rod-shaped member or part of the rod-shaped member joined to the cylindrical fixing member can inhibit such corrosion or rusting. By covering the joint area between the cylindrical fixing member and the rod-shaped member with the seal member, the external appearance also can be improved.

A snow lubrication device is also proposed in which a wire having pliability is used in place of the swing arm design described above. To fix the wire of this snow lubrication device to the vehicle body of the snowmobile, one end of the wire is inserted into a hole formed in a fixing member and stopped with a screw. The wire is fixed through the fixing member to the vehicle body. In some applications, vibrations or other conditions may cause the screw or other fattener to become dislodged. With this snow lubrication device, however, it is possible that the screw for fixing the wire to the fixing member may loosen, resulting in the wire being dislodged from the fixing member.

Another aspect is a snow lubrication device for a snowmobile for running on snow. The snow mobile has an endless track belt driven with a drive wheel by the drive of an engine, wherein the track belt is pressed against the snow surface, and wherein the snow lubrication device is configured to be attached to a front portion of the snowmobile for raking and scattering snow on the snow surface. The scattering snow lubricates a contact part between the track belt and a part of the snowmobile that is in contact with the track belt. The snow lubrication device comprises a fixing member comprising a fixing part fixed to the forward portion of the vehicle body of the snowmobile and a cylindrical member, a rod-shaped member having elasticity having a first end part coupled with the cylindrical part of the fixing member, and a snow rake member having a root end part coupled with a second end part of the rod-shaped member and having a front-end formed with a blade part for raking snow.

Another aspect is a snow lubrication device for a snowmobile having an endless track belt driven with a drive wheel by an engine, the snow lubrication device being attached to a front portion of the snowmobile. The snow lubrication device comprises a fixing member comprising a fixing part, the fixing part enabling the snow lubrication device to be fixed to the front portion of the snowmobile, an elastic rod-shaped member extending from the fixing member, and a snow rake member having a root end and a blade, the root end being fixed to the rod-shaped member, the blade being configured to rake and scatter snow to lubricate a contact region between the endless track belt and the snowmobile.

Another aspect is a snowmobile having a snow lubrication device attached to a front portion of the snowmobile and configured to rake and scatter snow to lubricate a contact region between an endless track belt and the snowmobile. The snowmobile comprises an engine, a drive wheel driven by the engine, an endless track belt driven by the drive wheel, and a seat located on a rear upper part of the snowmobile. The snowmobile further comprises handlebars configured for a rider to control a direction of movement for the snow mobile, a fixing member comprising a fixing part, the fixing part enabling the snow lubrication device to be fixed to the front portion of the snowmobile, an elastic rod-shaped member extending from the fixing member, and a snow rake member having a root end and a blade, the root end being fixed to the rod-shaped member, the blade being configured to rake and scatter snow to lubricate a contact region between the endless track belt and the snowmobile.

An aspect is a method for lubricating a contact region between an endless belt and a snowmobile having a snow lubrication device attached to a front portion of the snowmobile. The method comprises configuring an endless belt to contact against a snow surface so as to move a snowmobile in a forward direction, configuring to scatter snow at a location forward of the contact between the endless belt and the snow surface, configuring to direct the scattering snow rearward and toward said endless belt, configuring to lubricate the endless belt with the scattering snow, configuring to contact a snow lubrication device with a rock on the snow surface, and configuring to elastically deform the snow lubrication device as a result of the contact with the rock.

Another aspect is a method for manufacturing a snow lubrication device for a snowmobile, the snowmobile having an endless track belt driven with a drive wheel rotated by the drive of an engine. The method comprises providing a fixing member having a fixing part configured to be fixed to the snowmobile and a cylindrical member, inserting an end part of a rod-shaped member having elasticity into the cylindrical member of the fixing member, clamping the end part within the cylindrical member, and fixing a root end of a snow rake member to the other end part of the rod-shaped member, a rearward facing end of the snow rake member having a blade part configured to rake snow.

The systems and methods of the invention have several features, no single one of which is solely responsible for its desirable attributes. Without limiting the scope of the invention as expressed by the claims which follow, its more prominent features have been discussed briefly above. After considering this discussion, and particularly after reading the section entitled "Detailed Description of the Preferred Embodiments" one will understand how the features of the system and methods provide several advantages over traditional snow lubrication systems.

BRIEF DESCRIPTION OF THE DRAWINGS

These and other features, aspects and advantages of the present invention will now be described in connection with preferred embodiments of the invention, in reference to the accompanying drawings. The illustrated embodiments, however, are merely examples and are not intended to limit the invention. The following are brief descriptions of the drawings.

DETAILED DESCRIPTION OF THE PREFERRED EMBODIMENTS

The following detailed description is now directed to certain specific embodiments of the invention. However, the invention can be embodied in a multitude of different systems and methods. In this description, reference is made to the drawings wherein like parts are designated with like numerals throughout.

Figure 1:
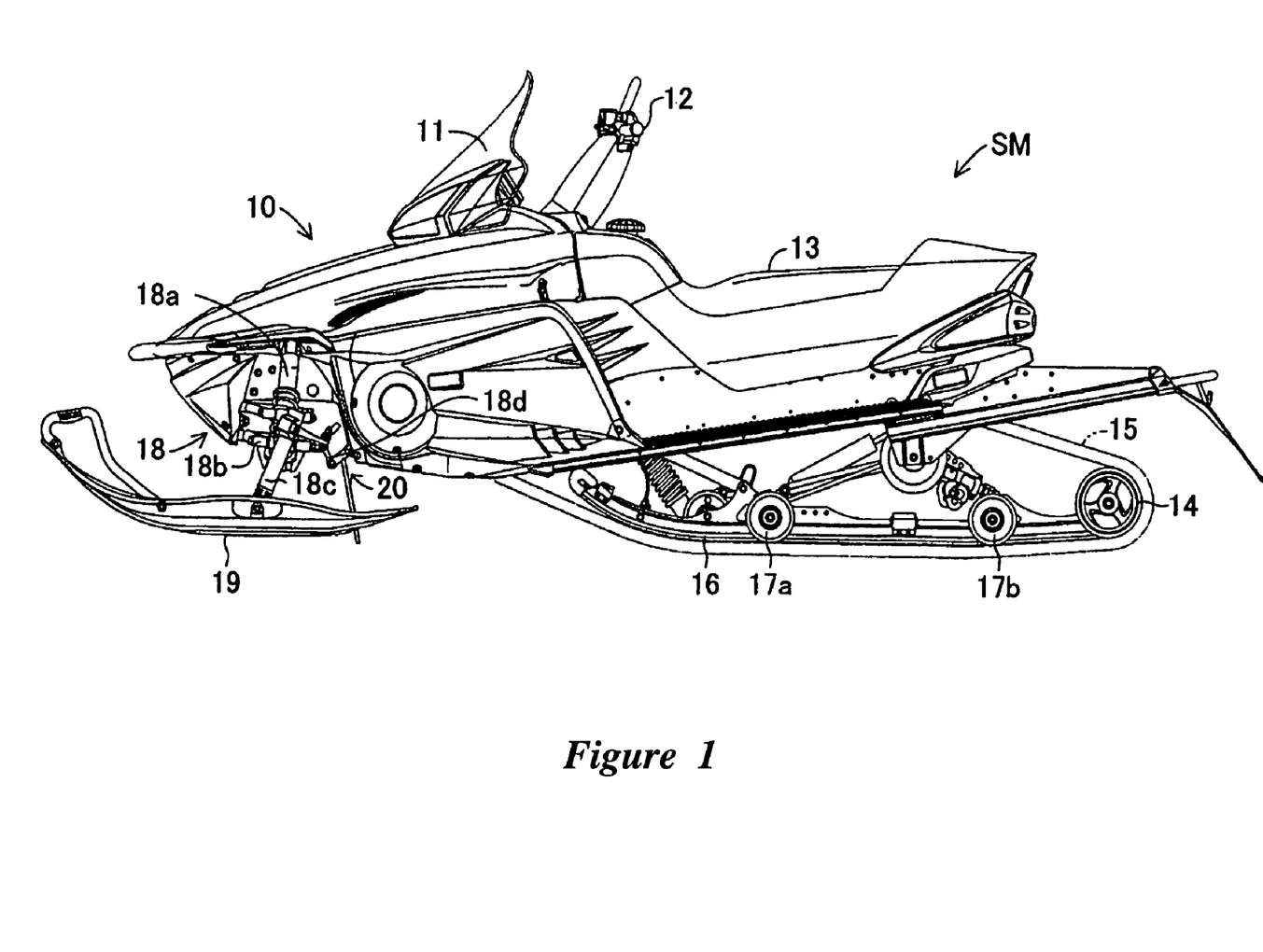
FIG. 1 is a side view of a snowmobile having a snow lubrication device according to a first embodiment of the invention.
Figure 2:
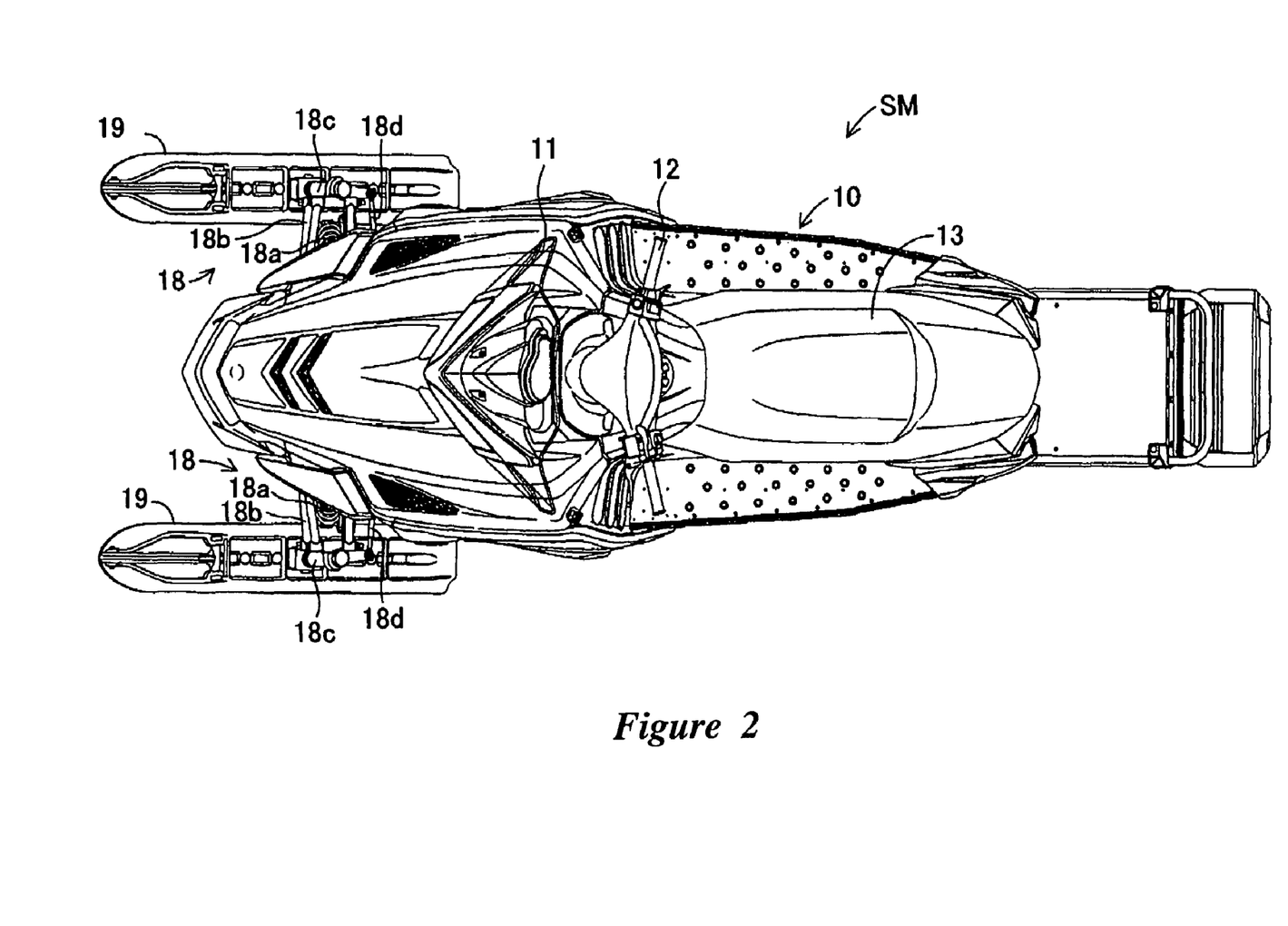
FIG. 2 is a plan view of the snowmobile shown in FIG. 1.

FIG. 1 is a side view of a snowmobile SM comprising a first embodiment of a snow lubrication device 20. FIG. 2 is a plan view of the snowmobile SM shown in FIG. 1 having a vehicle body 10. The snowmobile SM further comprises a windshield 11 located on the upper front part of the vehicle body 10 for averting wind. Handlebars 12 are located rearward of the windshield 11 and used to operate the snowmobile SM. A seat 13 for a rider is provided on a rear upper part of the vehicle body 10.

Drive wheels (not shown) comprising sprockets are located on both sides of the front part of the vehicle body 10. Rear wheels 14 are provided on both sides of the rear part of the vehicle body 10. A track belt 15 is routed around the drive wheels and the rear wheels 14. The track belt 15 has an outer circumferential surface with projections for engaging with the snow surface. As illustrated in FIG. 1, slide rails 16, free wheels 17a, 17b, etc. are located on a lower portion of the inside of the circumferential surface of the track belt 15.

The slide rails 16, free wheels 17a, 17b, etc. press the circulating track belt 15 against the snow surface. As a result, the track belt 15 circulates as the projections located on the underside of the track belt 15 engage with the snow surface to cause the snowmobile SM to move forward. Front suspensions 18 are connected to the handlebars 12 on both sides of the vehicle body 10. For ease of explanation, members of the left front suspension 18 have the same reference numerals as members of the right front suspension 18.

The front suspensions 18 comprise dampers 18a on both left and right sides of the vehicle body 10. Connecting rods 18c on both left and right sides connect to the dampers 18a through front suspension arms 18b and extend below the vehicle body 10. Corresponding skis 19 for steering are connected to the lower ends of the connecting rods 18c. The shapes of the respective members of the left and right front suspensions 18 and the steering skis 19 have left-right symmetry.

Figure 3:
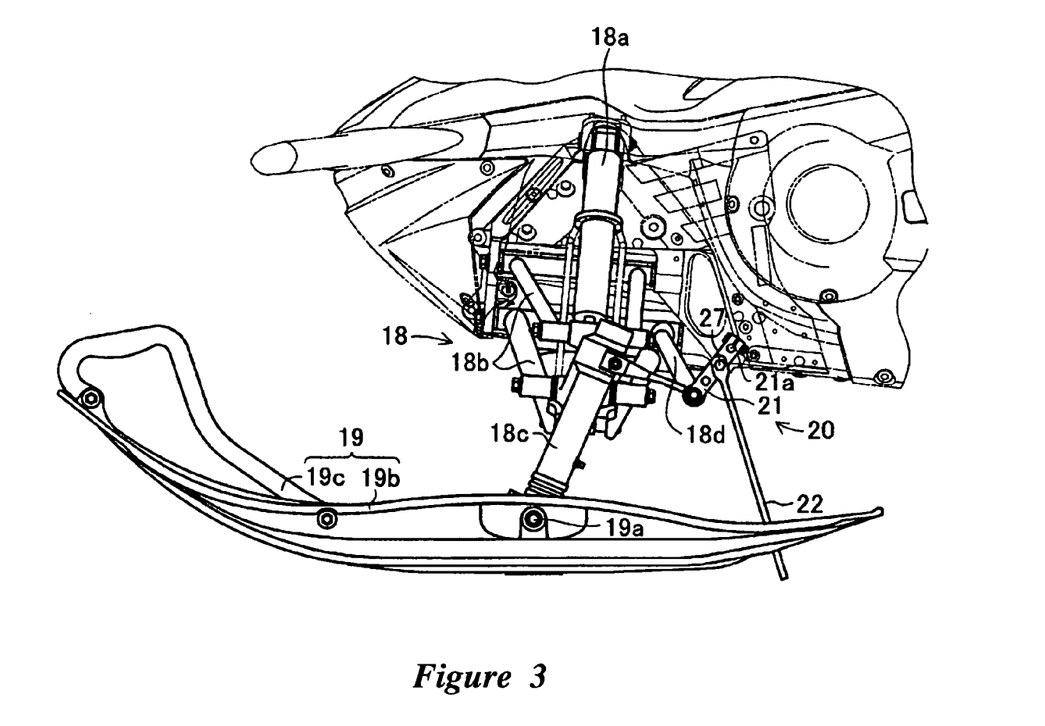
FIG. 3 is an enlarged front side view of the snowmobile and snow lubrication device according to the first embodiment.
Figure 4:
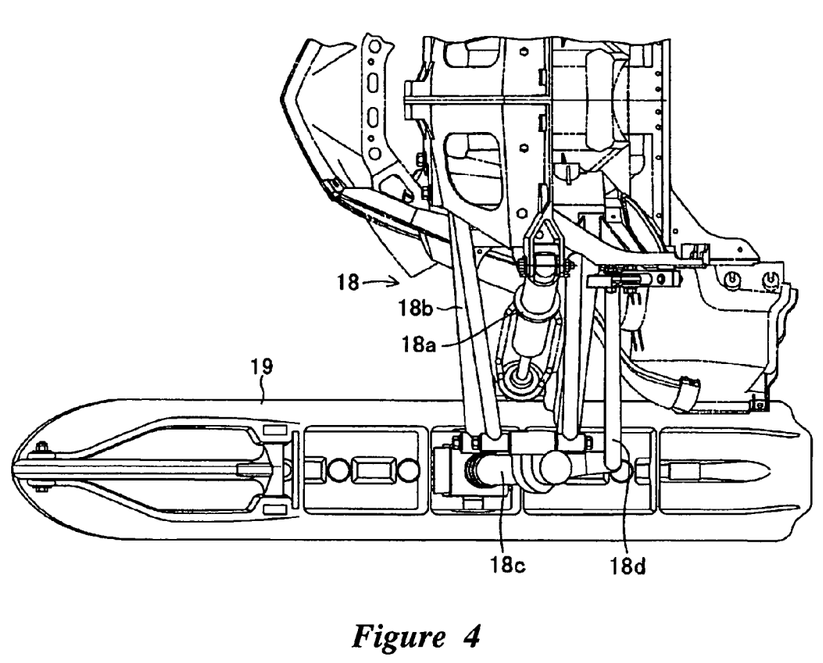
FIG. 4 is a plan view of the snowmobile from FIG. 3.

FIG. 3 is an enlarged front side view of the snowmobile SM and snow lubrication device 20. FIG. 4 is a plan view of the snowmobile SM from FIG. 3. The front suspension 18 also comprises, as shown in FIGS. 3 and 4, an arm part 18d for turning the connecting rod 18c about its axis. The arm part 18d moves back and forth according to the operation of the handlebars 12. With the back-and-forth motion, the steering ski 19 turns left and right. The steering ski 19 is connected to the connecting rod 18c through a support shaft 19a connected to the lower end of the connecting rod 18c. The steering ski 19 comprises a main part 19b in contact with the snow surface and a grip part 19c. The grip part 19c allows the steering ski 19 to be gripped by hand.

Figure 5:
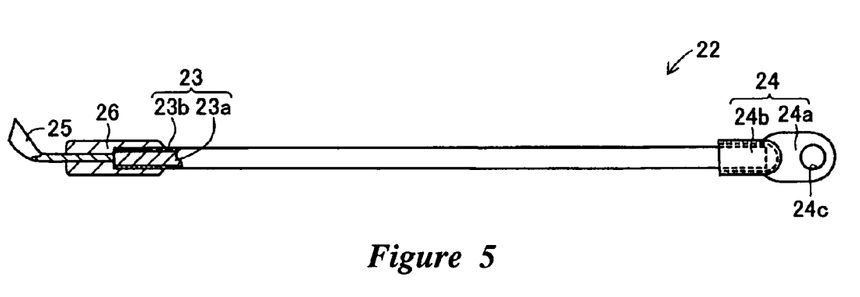
FIG. 5 is a front face view of a snow rake rod from the snow lubrication device for use on the left side of the snowmobile.
Figure 6:
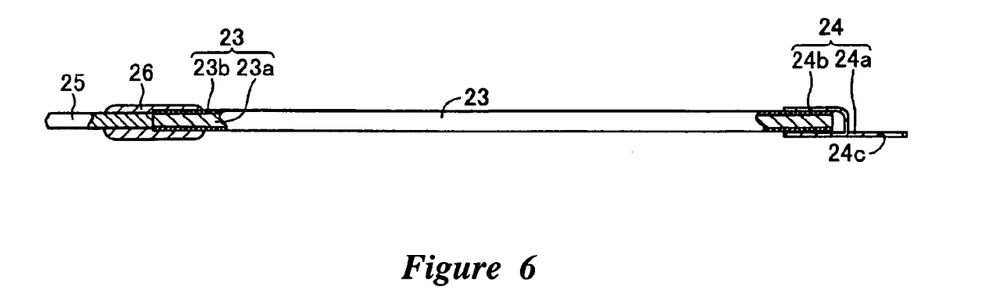
FIG. 6 is a side face view of the snow rake rod from FIG. 5.
Figure 7:
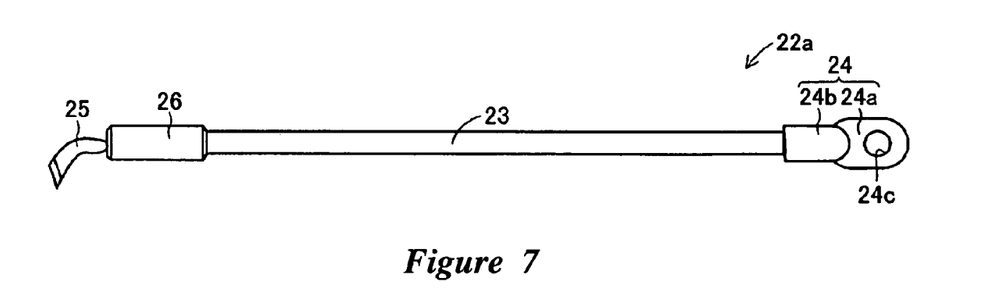
FIG. 7 is a front face view of a snow rake rod for use with the snow lubrication device on the right side of the snowmobile.

The snow lubrication device 20 is in the vicinity of each arm part 18d of the vehicle body 10. The snow lubrication device 20 comprises two fixing arms 21, each extending from a position slightly behind the arm part 18d of the vehicle body 10 obliquely in a downward and forward direction. The snow lubrication device 20 further comprises two snow rake rods 22, 22a (See FIG. 7 for 22a) fixed to the fixing arms 21 on the sides of the snowmobile SM. FIG. 5 is a front face view of the snow rake rod 22 for a left side of the vehicle body 10. FIG. 6 is a side face view of the snow rake rod 22 from FIG. 5, partially in section. FIG. 7 is a front face view of the snow rake rod 22a for a right side of the vehicle body 10. The snow rake rods 22, 22a are preferably used as a set on the snow lubrication device 20. Of course the snow lubrication device 20 could employ a single fixing arm 21 and single snow rake rod 22, but preferably employs two fixing arms and snow rake rods for both sides of the snowmobile.

As illustrated in FIG. 3, the fixing arm 21 may be made of a plate-shaped rod member having one or more fixing holes 21a along its length. The one or more fixing holes 21a allow attachment of the snow rake rod 22 at multiple positions.

As illustrated in FIG. 5, the snow rake rod 22 comprises an elastic rod-shaped member 23, a fixing member 24 fixed to one end of the rod-shaped member 23 and a snow rake member 25 attached to the other end of the rod-shaped member 23. A cylindrical fixing member 26 fixes the snow rake member 25 to the rod-shaped member 23. The rod-shaped member 23 comprises a core member 23a made from a wire covered with a plastic cover 23b. The core member 23a may be made from a metal iron wire or any other suitable, elastic material. In certain embodiments, the rod-shaped member 23 has an approximate length of 250 mm and a diameter of 8 mm.

Figure 8A:
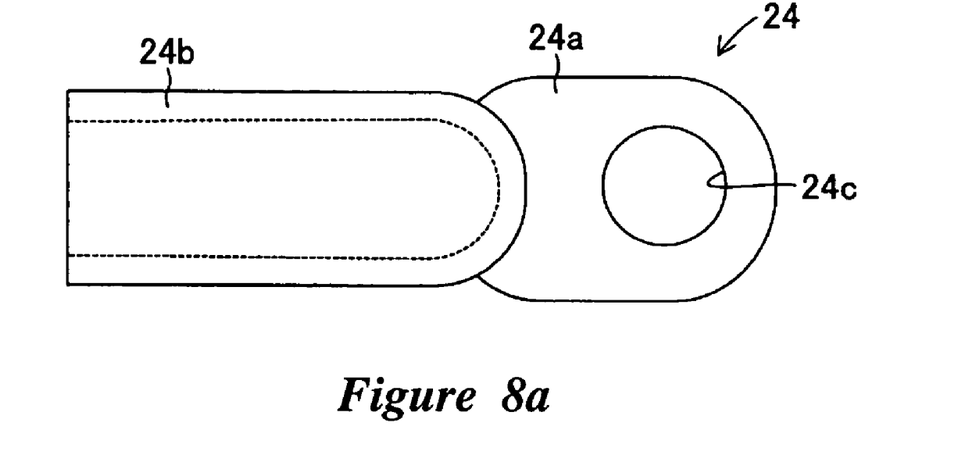
FIG. 8A is a front view of a fixing member.
Figure 8B:
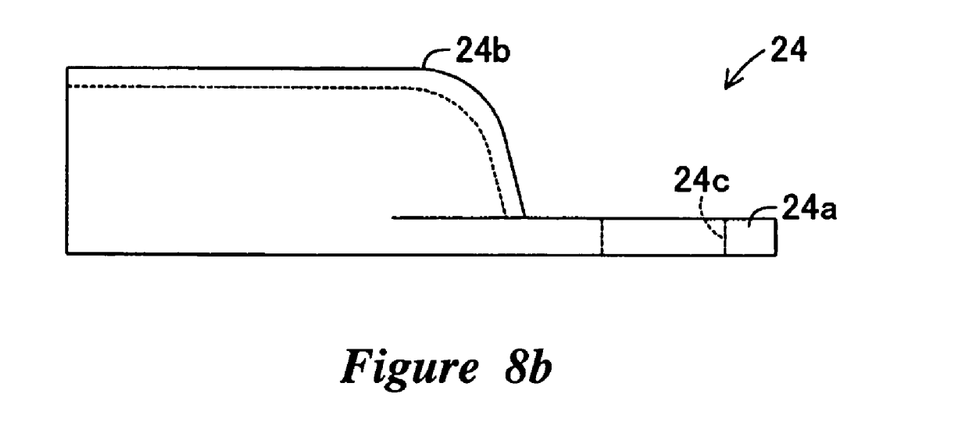
FIG. 8B is a side view of the fixing member shown in FIG. 8A.

FIG. 8A is a front view of the fixing member 24. FIG. 8B is a side view of the fixing member 24 shown in FIG. 8A. The fixing member 24 is preferably made of metal and comprises a fixing part 24a fixed to the fixing arm 21, and a cylindrical part 24b fixed to the rod-shaped member 23.

The fixing part 24a has a generally oval shape with an attachment hole 24c extending therethrough. The attachment hole 24c is offset from the center of the fixing part 24a in a distal direction towards the fixing arm 21. The cylindrical part 24b has a generally cylindrical shape. The rounded end of the cylindrical part 24b, as illustrated in FIG. 8A, is connected to the fixing part 24a. As illustrated in FIG. 8B, a surface of the fixing part 24a is flush with and coupled to a back side surface of the cylindrical part 24b. As illustrated in FIG. 5, the rod-shaped member 23 and the fixing part 24a are fixed together by inserting one end of the rod-shaped member 23 into the cylindrical part 24b. The cylindrical part 24b is clamped around the inserted end using a crimping process.

Figure 9A:
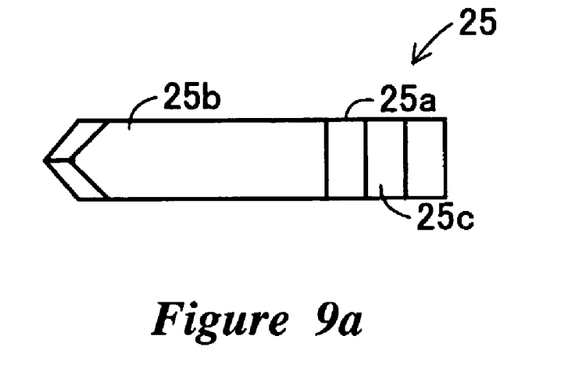
FIG. 9A is a plan view of the snow rake member.
Figure 9B:
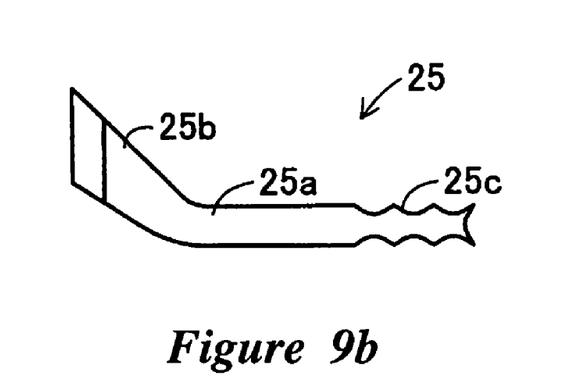
FIG. 9B is a front view of the snow rake member shown in FIG. 9A.
Figure 9C:
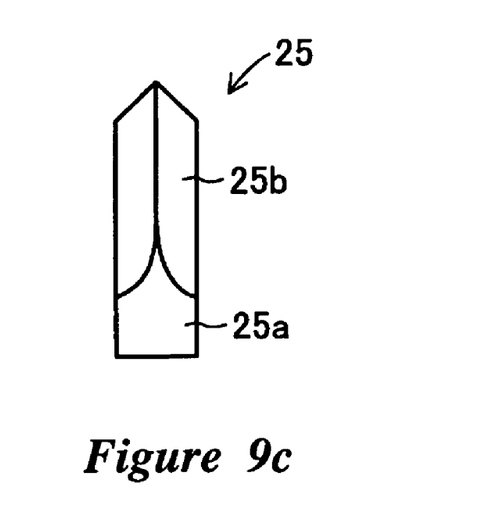
FIG. 9C is a side view of the snow rake member shown in FIG. 9A.

FIG. 9A is a plan view of the snow rake member 25. FIG. 9B is a front view of the snow rake member 25 shown in FIG. 9A. FIG. 9C is a side view of the snow rake member 25. In certain embodiments, the snow rake member 25 comprises cemented carbide. As shown in FIG. 5 and FIGS. 9A-9C, a root end part 25a is fixed to an end of the rod-shaped member 23. A front-end side of the root end part 25a is fixed to a blade part 25b.

The thickness or horizontal width shown in FIG. 9A of the root end part 25a is constant. The thickness of the blade part 25b decreases near the end of the blade part 25b. The width or vertical width shown in FIG. 9B is smaller at the root end part 25a and increases from the root end part 25a side and toward the front-end side. Both side surfaces are formed with irregular parts 25c having a wavy irregular shape along a longitudinal direction. Both side surfaces intersect at right angles relative to the width direction of the root end part 25a. The blade part 25b is shaped to curve from the root end part 25a side toward the front-end side.

As illustrated in FIG. 5, the cylindrical fixing member 26 has a cylindrical shape. In certain embodiments, the cylindrical fixing member 26 is made of metal. The end of the rod-shaped member 23 is inserted into the end of the member 26. The root end part 25a of the snow rake member 25 is inserted into the other end of the member 26 and clamped by a crimping process to fix the rod-shaped member 23 to the snow rake member 25. A gap between the root end part 25a and the cylindrical fixing member 26 is filled with adhesive or other filler agent. The filler agent and the irregular parts 25c formed on the root end part 25a firmly fix the snow rake member 25 to the rod-shaped member 23 through the cylindrical fixing member 26.

The snow rake rod 22a illustrated in FIG. 7 is the same as the snow rake rod 22 illustrated in FIG. 5 except that the direction of curvature for the snow rake member 25 of the snow rake rod 22a is opposite to the direction of curvature for the snow rake member 25 of the snow rake rod 22. For ease of explanation, corresponding parts for the left and right sides of the snow mobile SM have the same reference numerals. The snow rake rods 22 and 22a described above are fixed to the corresponding fixing arms 21 on the vehicle body 10 through bolts 27 and nuts or through other suitable fasteners. The snow rake rods 22 and 22a are attached by first aligning the attachment holes 24c of the snow rake rods 22 and 22a with one of the fixing holes 21a of the fixing arms 21. The bolts 27 are inserted into both holes. The nuts are then attached to the bolts 27.

A method of operation is described below. First, a switch located in the vicinity of the handlebars 12 is turned on. The switch starts the engine which drives the snowmobile SM. A throttle lever on the handlebar 12 controls the engine.

Figure 10:
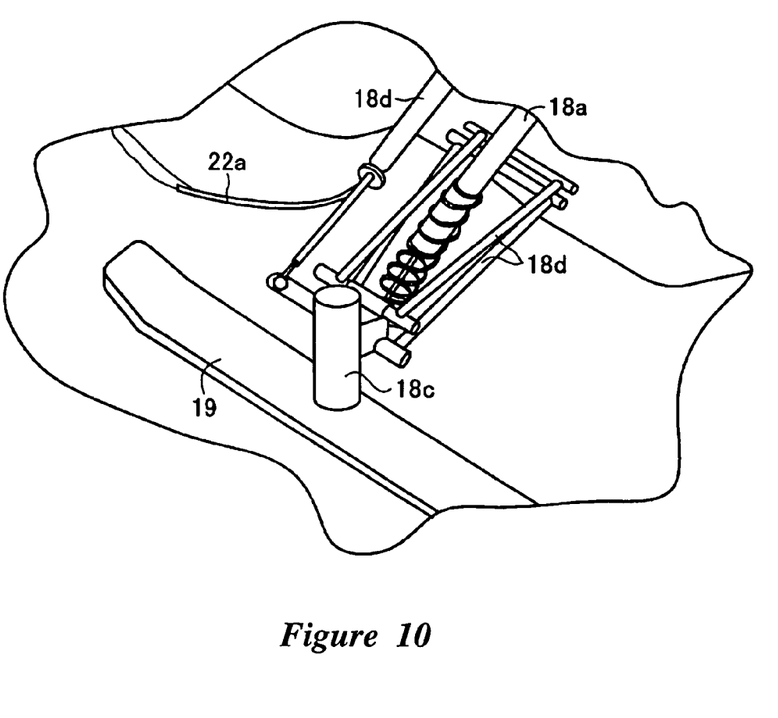
FIG. 10 is an oblique view of a state in which the snow rake rod rakes up snow and ice on the snow surface.

FIG. 10 is an oblique view of a state in which the snow rake rod 22a (See FIG. 7) on the right side of the vehicle body 10 rakes up snow and ice on the snow surface. This same description applies equally to the snow rake rod 22 on the left side of the vehicle body 10. The snow rake rod 22a deflects rearward as the blade part 25b of the snow rake rod 22a comes into contact with the snow surface. The blade part 25b rakes up snow and ice on the snow surface and scatters the snow rearward. The scattered snow adheres to the inner surface of the track belt 15 and finds its way into the gap between the track belt 15 and the slide rail 16, and into the gap between the track belt 15 and the drive wheel.

The scattered snow located in the gaps between the track belt 15 and the slide rail 16 and between the track belt 15 and the drive wheel provides lubrication. The lubricated track belt 15 improves the operation of the snowmobile SM. Even if the lower part of the snow rake rod 22a strikes a stone or the like, the elasticity of the rod-shaped member 23 allows the snow rake rod 22a to deflect further rearward. Even if the snow rake rod 22a strikes a stone or the like, the impact does not adversely affect operation of the snowmobile SM. When the snowmobile SM is made to run in reverse, the snow rake rod 22a is free to deflect towards the front of the vehicle body 10. Accordingly, the snow rake rod 22a does not hinder operation of the snowmobile SM in forward or reverse directions.

As described above, the rod-shaped member 23 is fixed to the fixing member 24 by crimping one end of the rod-shaped member 23 in the cylindrical part 24b of the fixing member 24. The rod-shaped member 23 is firmly fixed to the fixing member 24 to prevent the rod-shaped member 23 from dislodging from the fixing member 24. Further, since the root end part 25a of the snow rake member 25 is thinner than the end part of the rod-shaped member 23, the snow rake member 25 may have a small size and be light in weight.

As illustrated in FIG. 5, the rod-shaped member 23 and the snow rake member 25 may be fixed together by abutting the end of the root end part 25a of the snow rake member 25 against the end of the rod-shaped member 23. The adjacent ends are fitted within the cylindrical fixing member 26 and clamped using a crimping process. Further, both surfaces of the root end part 25a that are likely to experience shock from the snow surface or the like are formed with the irregular parts 25c. The gap between the root end part 25a and the cylindrical fixing member 26 is filled with adhesive. Therefore, the snow rake member 25 is firmly fixed to the rod-shaped member 23. Further, by covering the outer circumference of the core member 23a with a plastic cover 23b, the core member 23a is inhibited from developing rust.

Figure 11:
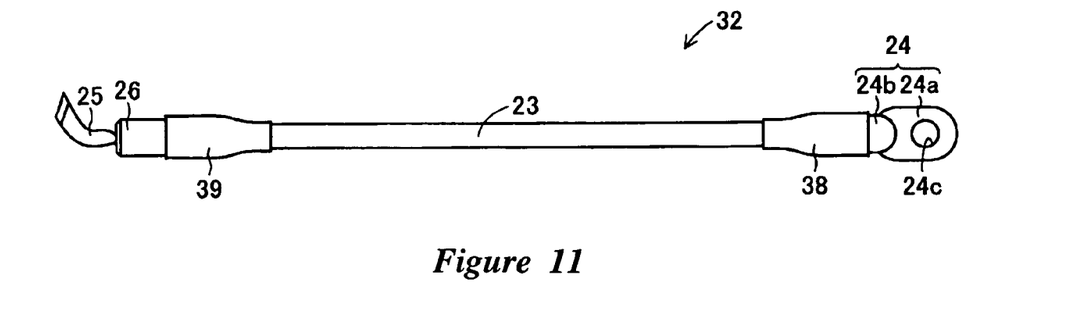
FIG. 11 is a front face view of a snow rake rod for use with the snow lubrication device according to a second embodiment having one or more seal members.

FIG. 11 is a front face view of a snow rake rod 32 for use with the snow lubrication device according to a second embodiment. The snow rake rod 32 is the same as the snow rake rod 22 described with reference to FIG. 5 except that the snow rake rod 32 comprises seal members 38, 39. For ease of explanation, the same parts are provided with the same reference numerals without repeating their descriptions. Like the embodiment described with reference to FIG. 5, the embodiment illustrated in FIG. 11 includes a pair of snow rake members 25 curving in opposite directions. The seal member 38 may be made of plastic and covers the joint between a rod-shaped part 23 and a fixing member 24. The seal member 39 may be made of plastic and covers the joint between the rod-shaped part 23 and a cylindrical fixing member 26.

The seal members 38, 39 inhibit water from finding its way into the joints between the rod-shaped member 23 and the fixing member 24 and into the joint between the rod-shaped member 23 and the cylindrical fixing member 26. The seal members 38, 39 inhibit water from seeping into the plastic cover 23b of the rod-shaped member 23 and inhibit the core member 23a inside the cover from developing rust. Further, covering the joint between the rod-shaped member 23 and the fixing member 24 with the seal member 38, and covering the joint between the rod-shaped member 23 and the cylindrical fixing member 26 with the seal member 39, improves the external appearance of the snow rake rod 32. The snow rake rod 32 performs the same function and effect of lubrication as the snow rake rod 22 described with reference to the first embodiment.

This invention is not limited to the above-described embodiments but may be appropriately modified and implemented accordingly. For example, while the plastic cover 23b and the seal members 38, 39 are made of plastic in certain embodiments, it is possible to make them from other materials. Further, in embodiments where the core member 23a of the rod-shaped member 23 is made of a rust-free material such as stainless steel, the plastic cover 23b may be omitted. Furthermore, shapes and materials of other parts of the snow lubrication device 20 related to this invention may be appropriately modified within the technical scope of this invention.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A snow lubrication device for a snowmobile for running on snow, the snow mobile having an endless track belt driven with a drive wheel by the drive of an engine, wherein the track belt is pressed against the snow surface, wherein the snow lubrication device is configured to be attached to a front portion of the snowmobile for raking and scattering snow on the snow surface, the scattering snow lubricating a contact part between the track belt and a part of the snowmobile that is in contact with the track belt, wherein the snow lubrication device comprises:

a fixing member comprising a fixing part fixed to the forward portion of the vehicle body of the snowmobile and a cylindrical member;

a rod-shaped member having elasticity and having a first end part coupled with the cylindrical member of the fixing member; and a snow rake member provided separately from the rod-shaped member, the snow rake member having a root end part coupled with a second end part of the rod-shaped member and having a front-end formed with a blade part for raking snow toward the track belt, wherein the root end part of the snow rake member is thinner than the second end part of the rod-shaped member, the rod-shaped member being fixed to the snow rake member by placing the root end and the second end part of the rod-shaped member both within a cylindrical fixing member, and wherein a gap between the cylindrical fixing member and the root end part of the snow rake member is filled with adhesive.

2. A snow lubrication device for a snowmobile having an endless track belt driven with a drive wheel by an engine, the snow lubrication device being attached to a front portion of the snowmobile, wherein the snow lubrication device comprises:

a fixing member comprising a fixing part, the fixing part enabling the snow lubrication device to be fixed to the front portion of the snowmobile;

an elastic rod-shaped member extending from the fixing member;

a snow rake member provided separately from the elastic rod-shaped member, the snow rake member having a root end and a blade, the root end being fixed to the rod-shaped member, the blade being configured to rake and scatter snow to lubricate a contact region between the endless track belt and the snowmobile; and a cylindrical fixing member, wherein the rod-shaped member is fixed to the snow rake member by placing both the root end and a second end of the rod-shaped member within the cylindrical fixing member.

3. A snowmobile having a snow lubrication device attached to a front portion of the snowmobile and configured to rake and scatter snow to lubricate a contact region between an endless track belt and the snowmobile, the snowmobile comprising:

an engine;

a drive wheel driven by the engine;

an endless track belt driven by the drive wheel;

a seat located on a rear upper part of the snowmobile;

handlebars configured for a rider to control a direction of movement for the snow mobile;

a fixing member comprising a fixing part, the fixing part enabling the snow lubrication device to be fixed to the front portion of the snowmobile;

an elastic rod-shaped member extending from the fixing member;

a snow rake member provided separately from the elastic rod-shaped member, the snow rake member having a root end and a blade, the root end being fixed to the rod-shaped member, the blade being configured to rake and scatter snow to lubricate a contact region between the endless track belt and the snowmobile; and a cylindrical fixing member, wherein the rod-shaped member is fixed to the snow rake member by placing both the root end and a second end of the rod-shaped member within the cylindrical fixing member.

4. A snow lubrication device for a snowmobile for running on snow, the snow mobile having an endless track belt driven with a drive wheel by the drive of an engine, wherein the track belt is pressed against the snow surface, wherein the snow lubrication device is configured to be attached to a front portion of the snowmobile for raking and scattering snow on the snow surface, the scattering snow lubricating a contact part between the track belt and a part of the snowmobile that is in contact with the track belt, wherein the snow lubrication device comprises:

a fixing member comprising a fixing part fixed to the forward portion of the vehicle body of the snowmobile and a cylindrical member;

a rod-shaped member having elasticity having a first end part coupled with the cylindrical member of the fixing member; and a snow rake member having a root end part coupled with a second end part of the rod-shaped member and having a front-end formed with a blade part for raking snow, wherein the root end part of the snow rake member is thinner than the second end part of the rod-shaped member, the rod-shaped member being fixed to the snow rake member by placing the root end and the second end part of the rod-shaped member both within a cylindrical fixing member, and wherein a gap between the cylindrical fixing member and the root end part of the snow rake member is filled with adhesive.

5. The snow lubrication device of claim 4, further comprising a seal member covering at least portions of the rod-shaped member and the cylindrical member.

6. The snow lubrication device of claim 4, further comprising a seal member covering at least portions of the root end and the second end part of the rod-shaped member.

7. A snow lubrication device for a snowmobile having an endless track belt driven with a drive wheel by an engine, the snow lubrication device being attached to a front portion of the snowmobile, wherein the snow lubrication device comprises:

a fixing member comprising a fixing part, the fixing part enabling the snow lubrication device to be fixed to the front portion of the snowmobile;

an elastic rod-shaped member extending from the fixing member;

a snow rake member having a root end and a blade, the root end being fixed to the rod-shaped member, the blade being configured to rake and scatter snow to lubricate a contact region between the endless track belt and the snowmobile; and a cylindrical fixing member, wherein the rod-shaped member is fixed to the snow rake member by placing both the root end and a second end of the rod-shaped member within the cylindrical fixing member.

8. The snow lubrication device of claim 7, wherein the contact region is between the endless track belt and a slide rail.

9. The snow lubrication device of claim 7, wherein the contact region is between the endless track belt and a free wheel.

10. The snow lubrication device of claim 7, wherein the rod-shaped member comprises a first end, and wherein the fixing member comprises a cylindrical member configured to receive the first end of the rod-shaped member.

11. The snow lubrication device of claim 10, further comprising a seal member covering at least portions of the rod-shaped member and the cylindrical member.

12. The snow lubrication device of claim 7, wherein the root end of the snow rake member is thinner than the second end of the rod-shaped member.

13. The snow lubrication device of claim 7, wherein a gap between the cylindrical fixing member and the root end part of the snow rake member is at least partially filled with adhesive.

14. The snow lubrication device of claim 7, further comprising a seal member covering at least portions of the cylindrical fixing member and the second end of the rod-shaped member.

15. A snowmobile having a snow lubrication device attached to a front portion of the snowmobile and configured to rake and scatter snow to lubricate a contact region between an endless track belt and the snowmobile, the snowmobile comprising:

an engine;

a drive wheel driven by the engine;

an endless track belt driven by the drive wheel;

a seat located on a rear upper part of the snowmobile;

handlebars configured for a rider to control a direction of movement for the snow mobile;

a fixing member comprising a fixing part, the fixing part enabling the snow lubrication device to be fixed to the front portion of the snowmobile;

an elastic rod-shaped member extending from the fixing member;

a snow rake member having a root end and a blade, the root end being fixed to the rod-shaped member, the blade being configured to rake and scatter snow to lubricate a contact region between the endless track belt and the snowmobile; and a cylindrical fixing member, wherein the rod-shaped member is fixed to the snow rake member by placing both the root end and a second end of the rod-shaped member within the cylindrical fixing member.

16. The snow lubrication device of claim 15, wherein the rod-shaped member comprises a first end, and wherein the fixing member comprises a cylindrical member configured to receive the first end of the rod-shaped member.

17. The snow lubrication device of claim 16, further comprising a seal member covering at least portions of the rod-shaped member and the cylindrical member.

18. The snow lubrication device of claim 15, wherein the root end of the snow rake member is thinner than the second end of the rod-shaped member.

19. The snow lubrication device of claim 15, wherein a gap between the cylindrical fixing member and the root end part of the snow rake member is at least partially filled with adhesive.

20. The snow lubrication device of claim 15, further comprising a seal member covering at least portions of the cylindrical fixing member and the second end of the rod-shaped member.

* * * * *

UNITED STATES PATENT AND TRADEMARK OFFICE
CERTIFICATE OF CORRECTION

| | | |
|---|---|---|
| PATENT NO. | : 7,527,116 B2 | Page 1 of 1 |
| APPLICATION NO. | : 11/345636 | |
| DATED | : May 5, 2009 | |
| INVENTOR(S) | : Masaru Aoshima | |

It is certified that error appears in the above-identified patent and that said Letters Patent is hereby corrected as shown below:

Column 5, Line 17, please delete "21 a" and insert --21a--, therefor.

Signed and Sealed this

Second Day of February, 2010

David J. Kappos
*Director of the United States Patent and Trademark Office*